US008635612B2

(12) United States Patent
Oney et al.

(10) Patent No.: US 8,635,612 B2
(45) Date of Patent: Jan. 21, 2014

(54) SYSTEMS AND METHODS FOR HYPERVISOR DISCOVERY AND UTILIZATION

(75) Inventors: Adrian J. Oney, Woodinville, WA (US); Andrew John Thornton, Seattle, WA (US); Eric P. Traut, Bellevue, WA (US); Nathan T. Lewis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2420 days.

(21) Appl. No.: 11/119,200

(22) Filed: Apr. 29, 2005

(65) Prior Publication Data

US 2006/0248528 A1    Nov. 2, 2006

(51) Int. Cl.
*G06F 9/455* (2006.01)
(52) U.S. Cl.
USPC ............................................................ 718/1
(58) Field of Classification Search
USPC ............................................................ 718/1
See application file for complete search history.

(56) References Cited

U.S. PATENT DOCUMENTS 5,511,217 A * 4/1996 Nakajima et al. ............. 718/100
5,940,613 A * 8/1999 Berliner ........................ 719/324
6,349,342 B1 * 2/2002 Menges et al. ................ 719/316
7,290,261 B2 * 10/2007 Burky et al. .................. 718/107
2005/0188374 A1 * 8/2005 Magenheimer ............... 718/100
2006/0031827 A1 * 2/2006 Barfield et al. ............... 717/168

OTHER PUBLICATIONS

Barham, P., et al, "Xen and the Art of Virtualization", ACM Symposium on Operating Systems Principles, 2003, pp. 164-177.*

* cited by examiner

*Primary Examiner* — Gregory A Kessler
(74) *Attorney, Agent, or Firm* — Woodcock Washburn, LLP

(57) ABSTRACT

Systems and methods are provided, whereby partitions may become enlightened and discover the presence of a hypervisor. Several techniques of hypervisor discovery are discussed, such as detecting the presence of virtual processor registers (e.g. model specific registers or special-purpose registers) or the presence of virtual hardware devices. Upon discovery, information (code and/or data) may be injected in a partition by the hypervisor, whereby such injection allows the partition to call the hypervisor. Moreover, the hypervisor may present a versioning mechanism that allows the partition to match up the version of the hypervisor to its virtual devices. Next, once code and/or data is injected, calling conventions are established that allow the partition and the hypervisor to communicate, so that the hypervisor may perform some operations on behalf of the partition. Four exemplary calling conventions are considered: restartable instructions, a looping mechanism, shared memory transport, and synchronous or asynchronous processed packets. Last, cancellation mechanisms are considered, whereby partition requests may be cancelled.

20 Claims, 14 Drawing Sheets

Register Access With No Hypervisor Present

Register Access With Hypervisor Present

Detection of Virtualizing Program Via The Presence Of A Virtual Hardware Device

SYSTEMS AND METHODS FOR HYPERVISOR DISCOVERY AND UTILIZATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

FIELD OF THE INVENTION

The present invention generally relates to the field of virtual machines or partitions and to operating systems that execute in virtual machine environments. More specifically, the present invention is directed to systems and methods for hypervisor discovery and utilization.

BACKGROUND OF THE INVENTION

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by Motorola, Inc., the Intel 80X86 processor family, manufactured by Intel Corporation; and the PowerPC processor family, which is manufactured by Motorola, Inc. and used in computers manufactured by Apple Computer, Inc. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system. Virtual machines can solve any of the problems discussed above that arise from processor and instruction set uniqueness.

It is generally desirable to have more rather than fewer applications run on a microprocessor family. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It might also be possible to use virtualizer programs to execute concurrently on a single CPU multiple incompatible operating systems. In this latter arrangement, although each operating system is incompatible with the other, virtualizer programs can host each of the several operating systems and thereby allow the otherwise incompatible operating systems to run concurrently on the same host computer system.

When a guest computer system is emulated on a host computer system, the guest computer system is said to be a "virtual machine" (or alternatively, it can be referred to as a "partition") since the guest computer system only exists in the host computer system as a pure software representation of the operation of one specific hardware architecture. The terms "virtualizer," "emulator," "direct-executor," "virtual machine," "processor emulation," and virtualization program are sometimes used interchangeably to denote the ability to mimic or emulate the hardware architecture of an entire computer system using one or several approaches known and appreciated by those of skill in the art. Moreover, all uses of the term "emulation" in any form is are intended to convey this broad meaning and is are not intended to distinguish between instruction execution concepts of emulation versus direct-execution of operating system instructions in the virtual machine. Thus, for example, the Virtual PC software created by Connectix Corporation of San Mateo, Calif. "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

In a traditional virtual machine environment, operating systems running in partitions are "unenlightened" in that they are not aware of the hypervisor and believe they are operating on a single physical machine. An operating system that has been modified so that it is aware of the hypervisor is deemed "enlightened" and can use hypervisor services. Moreover, partial enlightenment can be attained by a partition if hypervisor aware code, such as a driver, is installed which uses hypervisor services to redirect requests such as disk, networking, and video operations. It would be advantageous to provide methods and systems related to discovering the hypervisor and then enumerating and utilizing its services for operating system that are enlightened to some degree.

SUMMARY OF THE INVENTION

Systems and methods are presented that allow for the discovery of a virtualizing program, such as a hypervisor, and then allow for the injection of information by the virtualizing program into a partition. Following such injection, calling conventions can be established in a variety of ways: either based on (1) restartable instructions; (2) a looping mechanism; (3) shared memory transport; or (4) a synchronous or asynchronous packet-based mechanisms.

In one aspect of the invention, the discovery of the virtualizing program is based on registers, for example, model specific registers (MSRs); in another aspect, it is based on virtual hardware devices. Versioning mechanisms are presented that allow the virtualizing program and the partition to match up the appropriate version of the virtualizing program. Following this, in one aspect of the invention, code can be injected into a partition by the virtualizing program; in another aspect, data can be injected by the virtualizing program. In yet another aspect of the invention, calling conventions can be established between the virtualizing program and the partition that allow the partition to utilize any services the virtualizing program might perform on behalf of the partition. In one example, if the restartable instruction calling convention is deployed, the partition instruction pointer is not advanced upon a restart of an operation performed by the virtualizing program; if the looping calling convention is deployed, the instruction pointer is advanced when an operation is continued following some interrupting external event.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, various aspects of the invention are shown. However, the invention is not limited to the specific systems and methods disclosed. The following figures are included.

DETAILED DESCRIPTION OF ILLUSTRATIVE EMBODIMENTS

Overview

At the outset, an exemplary computing environment suitable to aspects of the present invention is described. Next, a general overview of a virtual machine environment is discussed. Last, aspects of mechanisms for hypervisor discovery and utilization are presented. Specifically, two types of hypervisor discovery mechanisms are contemplated: virtual processor registers and virtual hardware devices. Following hypervisor discovery, code and data injection mechanisms are discussed, whereby the hypervisor injects such code and/or data into a selected partition upon ascertainment of the appropriate hypervisor version suitable for a partition. After such injection, four types of calling conventions are discussed: restartable instructions, a looping mechanism, shared memory transport, and synchronous or asynchronous processed packets. Ancillary to calling conventions, cancellation mechanisms for canceling operations performed by a hypervisor are discussed.

Exemplary Computing Environment

Figure 1:
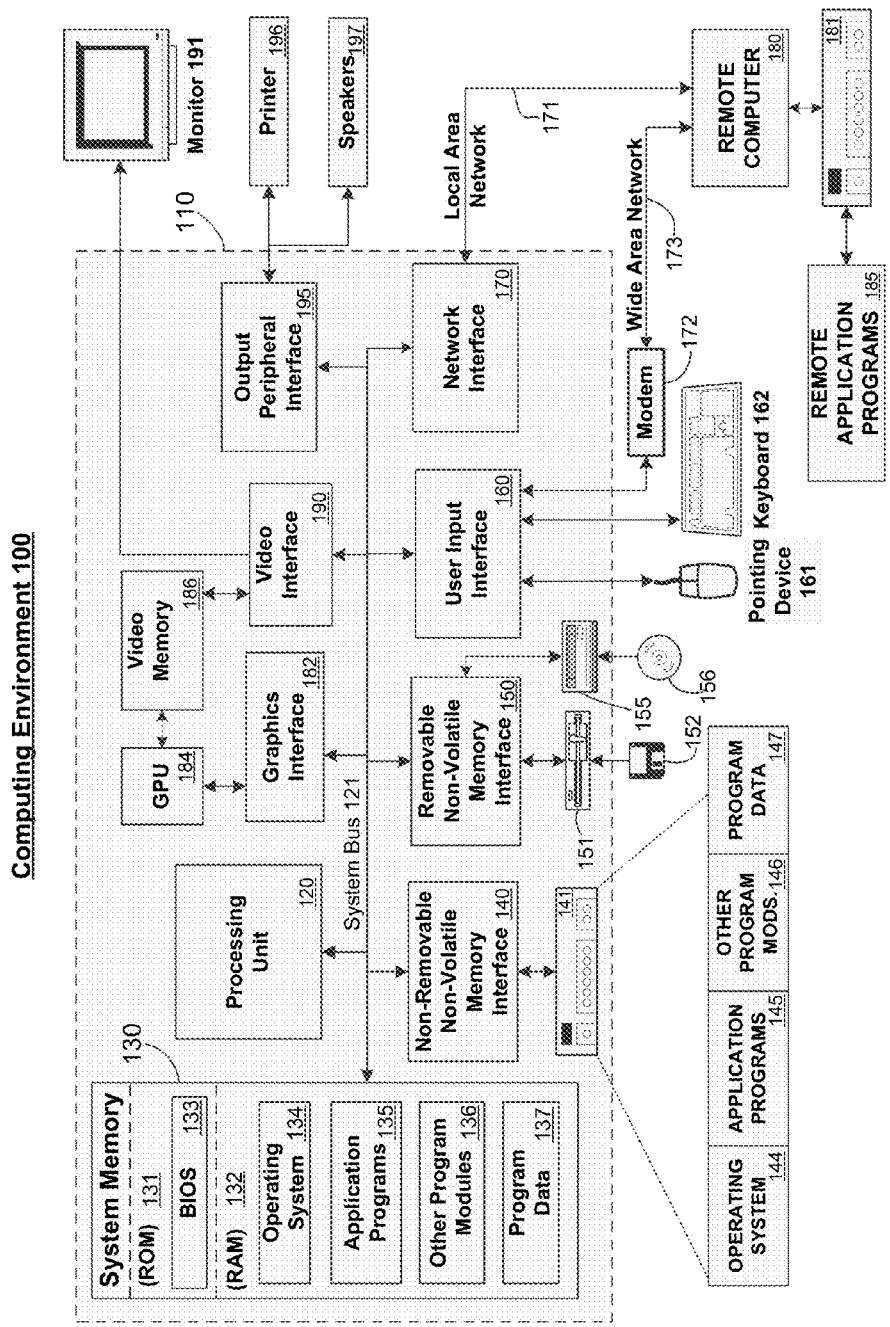
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137, whereby the operating system 134 can within a virtual machine partition maintained by a virtual machine monitor or a hypervisor.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing-on-memory device 181. It will be appreciated that the network connections shown are exemplary and other means of establishing a communications link between the computers may be used.

Virtual Machines

Figure 2:
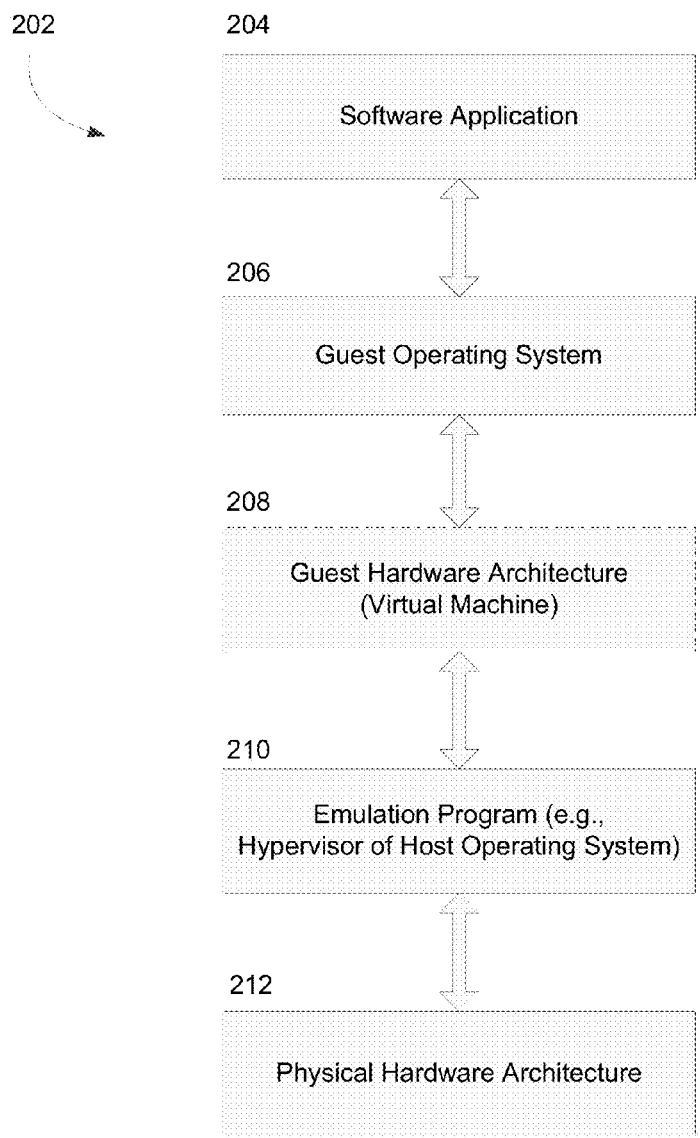
FIG. 2 is a block diagram representing the logical layering of the hardware and software architecture for an emulated operating environment in a computer system.

FIG. 2 is a diagram representing the logical layering of the hardware and software architecture for an emulated operating environment in a computer system. In the figure, an emulation program 210 runs directly or indirectly on the physical hardware architecture 212. The emulation program 210 may be a virtual machine monitor that runs alongside a host operating system or a host operating system with a hypervisor component wherein the hypervisor component performs the emulation. The emulation program 210 emulates a guest hardware architecture 208 (shown as dashed lines to illustrate the fact that this component is the "virtual machine" or "partition," that is, hardware that does not actually exist but is instead emulated by the emulation program 210). A guest operating system 206 executes on the guest hardware architecture 208, and a software application 204 runs on the guest operating system 206. In the emulated operating environment of FIG. 2—and because of the operation of emulation program 210—the software application 204 can run in a computer system 202 even if the software application 204 is designed to run on an operating system that is generally incompatible with a host operating system and the hardware architecture 212.

Figure 3A:
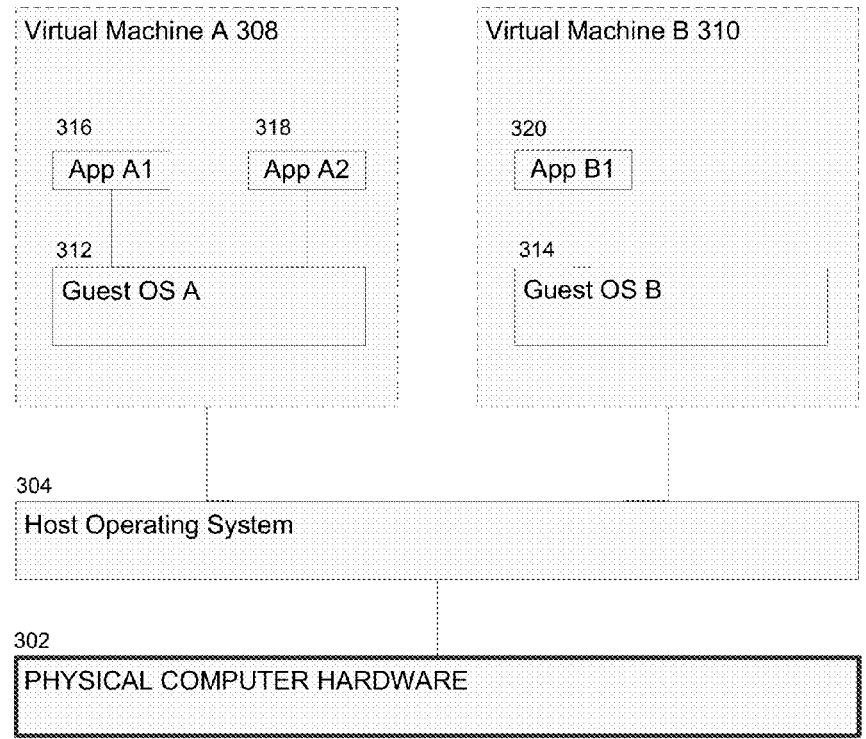
FIG. 3A is a block diagram representing a virtualized computing system wherein the emulation is performed by the host operating system (either directly or via a hypervisor)

FIG. 3A illustrates a virtualized computing system comprising a host operating system software layer 304 running directly above physical computer hardware 302 where the host operating system (host OS) 304 provides access to the resources of the physical computer hardware 302 by exposing interfaces that are the same as the hardware the host OS is emulating (or "virtualizing")—which, in turn, enables the host OS to go unnoticed by operating system layers running above it. Again, to perform the emulation, the host operating system 304 may be a specially designed operating system with native emulations capabilities or, alternately, it may be a standard operating system with an incorporated hypervisor component for performing the emulation (not shown).

Referring again to FIG. 3A, above the host OS 304 are two virtual machine (VM) implementations, VM A 308, which may be, for example, a virtualized Intel 386 processor, and VM B 310, which may be, for example, a virtualized version of one of the Motorola 680X0 family of processors. Per each VM 308 and 310 are guest operating systems (guest OSs) A 312 and B 314, respectively. Running on guest OS A 312 are two applications, application A1 316 and application A2 318, and running on guest OS B 314 is application B1 320.

In regard to FIG. 3A, it is important to note that VM A 308 and VM B 310 (which are shown in dashed lines) are virtualized computer hardware representations that exist only as software constructions. They are made possible due to the execution of specialized emulation software(s) that not only presents VM A 308 and VM B 310 to Guest OS A 312 and Guest OS B 314, respectively, but which also performs all of the software steps necessary for Guest OS A 312 and Guest OS B 314 to indirectly interact with the real physical computer hardware 302.

Figure 3B:
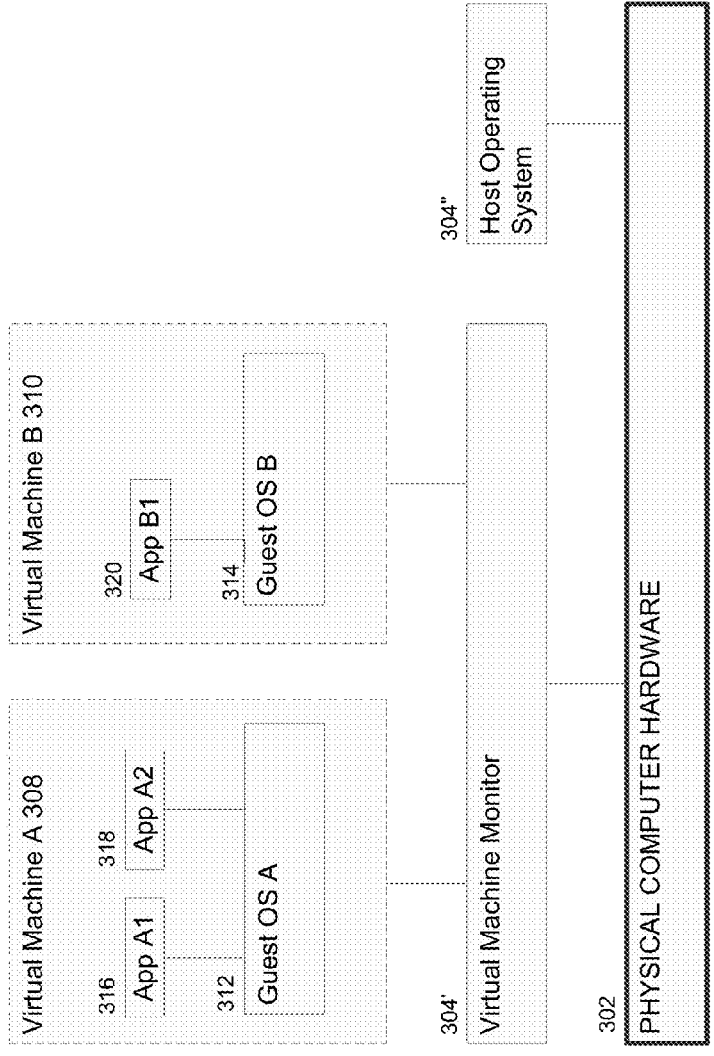
FIG. 3B is a block diagram representing an alternative virtualized computing system wherein the emulation is performed by a virtual machine monitor running side-by-side with a host operating system.

FIG. 3B illustrates an alternative virtualized computing system wherein the emulation is performed by a virtual machine monitor (VMM) 304' running alongside the host operating system 304". In certain cases, the VMM 304' may be an application running above the host operating system 304" and interacting with the computer hardware 302 only through the host operating system 304". In other cases, as shown in FIG. 3B, the VMM 304' may instead comprise a partially independent software system that on some levels interacts indirectly with the computer hardware 302 via the host operating system 304" but on other levels the VMM 304' interacts directly with the computer hardware 302 (similar to the way the host operating system interacts directly with the computer hardware). And yet in other cases, the VMM 304' may comprise a fully independent software system that on all levels interacts directly with the computer hardware 302 (similar to the way the host operating system interacts directly with the computer hardware) without utilizing the host operating system 304" (although still interacting with the host operating system 304" in order to coordinate use of the computer hardware 302 and avoid conflicts and the like).

All of these variations for implementing the virtual machine are anticipated to form alternative aspects of the present invention as described herein, and nothing herein should be interpreted as limiting the invention to any particular emulation embodiment.

Aspects of Mechanisms for Hypervisor Discovery and Utilization

Figure 4A:
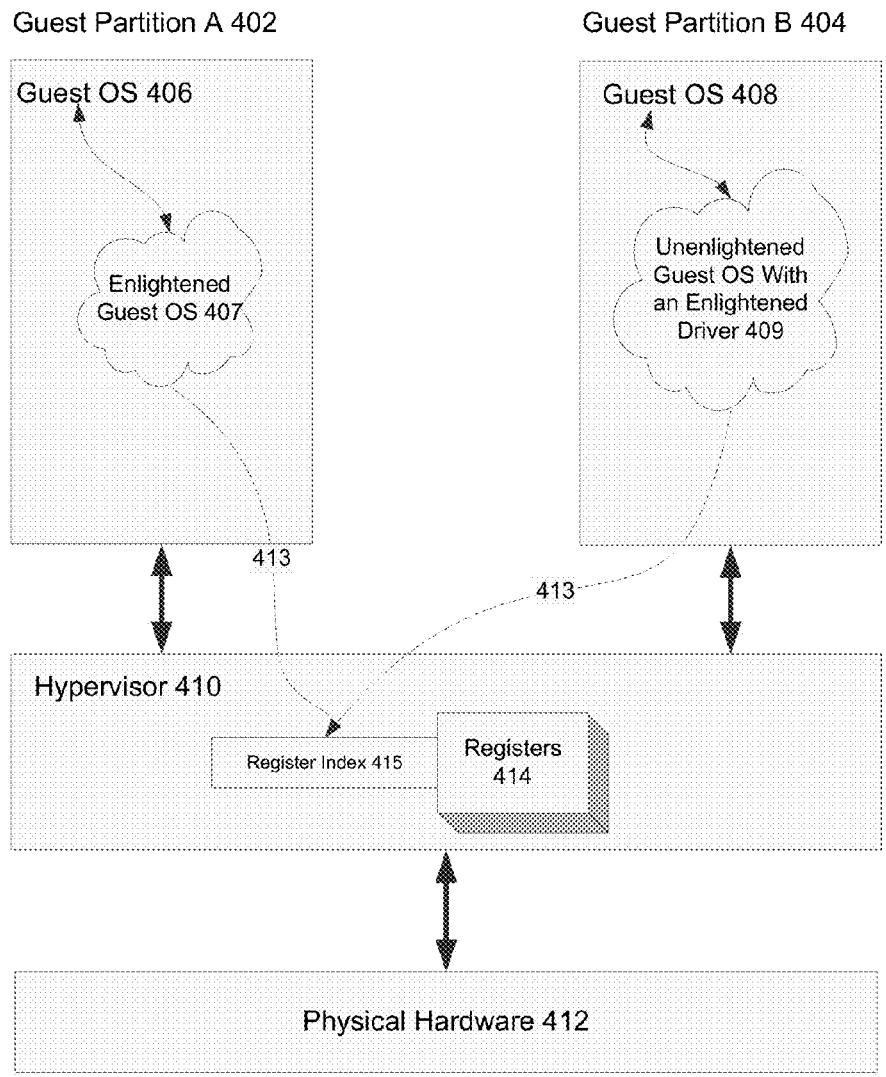
FIG. 4A illustrates hypervisor discovery using MSRs, where these MSRs can accessed in order to discover hypervisor presence.

In one aspect of the invention, a guest operating system that has been "enlightened" (i.e. modified to have knowledge that it is running within a virtualized environment) or an operating system that has an enlightened driver, is able to discover whether or not it is running on top of a virtualizing program, such as a hypervisor. Upon the discovery, it can request services from the virtualizing program. FIG. 4A illustrates one type of hypervisor discovery device, which uses registers. In an exemplary architecture, such as the x86 architecture, Model-Specific Registers (MSRs) may be used. In the x86 platform, MSRs are registers that are not guaranteed as part of the Intel Architecture (i.e. they are not guaranteed to be present in future CPU models) but are provided with future expandability in mind. The MSR are just exemplary registers, and other types of registers may be used that provide extensions to an existing processor's register set. Thus, in the context of the PowerPC, special-purpose registers (SPRs) can be used.

In FIG. 4A, two guest partitions are illustrated: a guest partition A 402 and a guest partition B 404. The guest partition A 402 has a guest operating system (OS) 406 that is enlightened 407. As mentioned above, "enlightened" simply means that an operating system is aware that it may be running within a virtualized environment and not on real hardware. Similarly, an unenlightened OS, such as guest OS 408 in partition B 404, may nevertheless have an enlightened driver 409 that is capable of discovering the hypervisor 410.

The hypervisor 410, running on top of real hardware 412, is modeled as a central processing unit (CPU) extension with a number of registers 414 that allow a guest OS to discover the hypervisor 410 and communicate with it. Notably, these registers 414 fall into two classes: (1) those that apply across a partition, and (2) those that apply to specific virtual processors within the partition. Moreover, partition-wide registers are accessible from any virtual processor but are backed by a single storage location. Thus, if virtual processor A modifies a partition-wide register, virtual processor B in the same partition will immediately be able to read the new value from the registers.

In FIG. 4A, either the enlightened guest OS 407 or the unenlightened OS with an enlightened driver 409 can discover if it is running on top of the hypervisor 410 by reading from the register index 415 of the registers 414. The register index 415 is architecturally reserved for software to use and is thus guaranteed to not be implemented by real hardware. This means that on a machine without a hypervisor, an attempted read of the register index 415 will be to an unimplemented registers and will cause a general protection fault, which a guest OS can take as an indication that no hypervisor is present. Conversely, on a hypervisor machine with the registers 414, attempted access to the index 415 will be trapped 417 to the hypervisor 410, where the access can be simulated. In this case, the guest OS 407 would not observe a general protection fault.

Figure 4C:
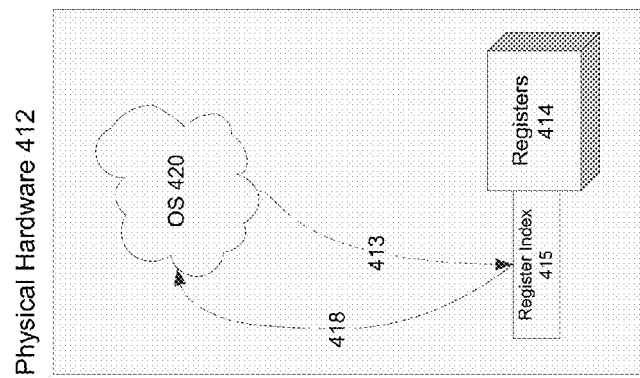
FIG. 4C illustrates, in contrast to FIG. 4B, the effects of accessing the MSRs when the hypervisor is not present.
Figure 4B:
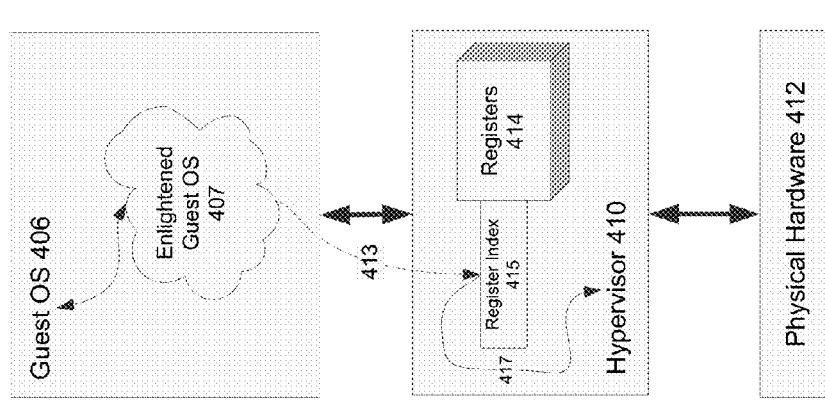
FIG. 4B illustrates the effects of accessing the MSRs when the hypervisor is actually present.

FIGS. 4B and 4C illustrate the scenario when a hypervisor is present and when a hypervisor is not present, respectively. In FIG. 4B, the enlightened guest OS 407 attempts to access 413 the register index 415 of the registers 414. Because the hypervisor 410 is present in FIG. 4B, the access 413 is trapped 417 to the hypervisor 410. Moreover, once the enlightened guest OS 407 determines that it is running on top of the hypervisor 410, it can use several other registers to set up an interface through which the hypervisor can then be called.

Conversely, in FIG. 4C the hypervisor 410 is not present. In fact, the OS 420 is running on some physical hardware 412. When an access 413 attempt is made by an OS 420, this access (read) will be to an unimplemented MSR and it will cause a general protection fault 418. The general protection fault 418, in turn, can be interpreted by the OS 420 as an indication that no hypervisor 410 is present.

Figure 4D:
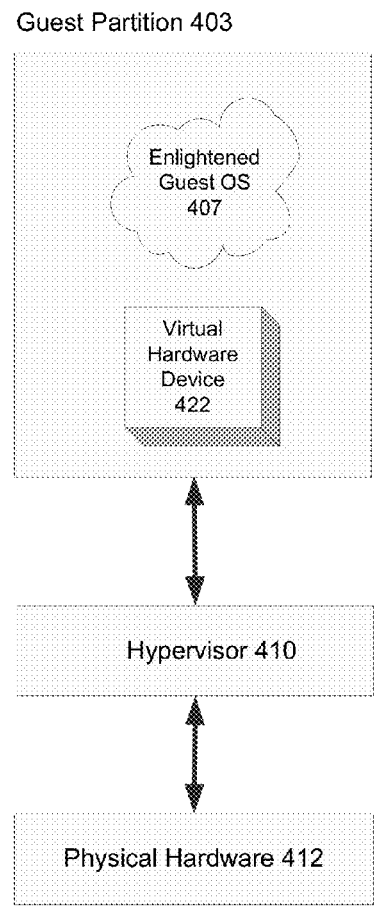
FIG. 4D illustrates the detection of virtualizing program via the presence of a virtual hardware device.

Alternatively, in FIG. 4D, the presence of the hypervisor can be discovered through the presence of a virtual hardware device 422. Software typically with hardware uses a memory-mapped I/O. Such hardware is accessed using the same instructions that read from and write to memory. Some processors, including the x86 family, also provide a separate I/O address space. These addresses are referred to as "ports" and are accessed via separate, specialized instructions. Regardless of how hardware is accessed by software, these interactions can be intercepted by a virtualizing program such as the hypervisor 410. The hypervisor can respond to these intercepts in such a way that the guest OS "sees" and interacts with a hardware device (in this case, an emulated hardware device that is implemented in software). Typically, such emulated hardware devices are modeled after existing hardware. However, this need not be the case. The hypervisor could emulate a hardware device that is designed with the purpose of allowing the guest to discover the presence of the hypervisor. The mere presence of this emulated hardware may tell the guest OS that it is running within a virtualized environment. The emulated hardware can also be extended to provide additional facilities such as version information, configuration settings, and even a call interface between the guest and the hypervisor.

Once the hypervisor has been discovered, information about the facilities it supports must be made available to the guest OS. Thus, in another aspect of the invention, in FIG. 5, the guest OS 504 upon reading the registers discussed above in FIGS. 4A-4C, or interacting with virtual hardware device in FIG. 4D, determines the versions of a hypercall interface 506 that the hypervisor 508 supports. Such a hypercall interface 506 is designed to handle hypercalls, where a hypercall is simply understood to be a deliberate programmatic entry into the hypervisor by a guest OS—generally to ask the hypervisor for services.

The hypervisor 508 presents a number of discrete interfaces to the guest OS 504, and the guest OS 504 selects a particular one. Thus, in FIG. 5, three versions of the hypercall interface 506 are presented: version 1.0, 2.0, and 8.5. The guest selects the appropriate version. Upon selection, the guest OS 504 knows a priori (from documentation and header files) the number of code pages 503A-503D that must be allocated for a particular selected version. Alternatively, the guest OS 504 could reference a virtualized register, such as an MSR, to determine how many pages are needed.

Figure 5:
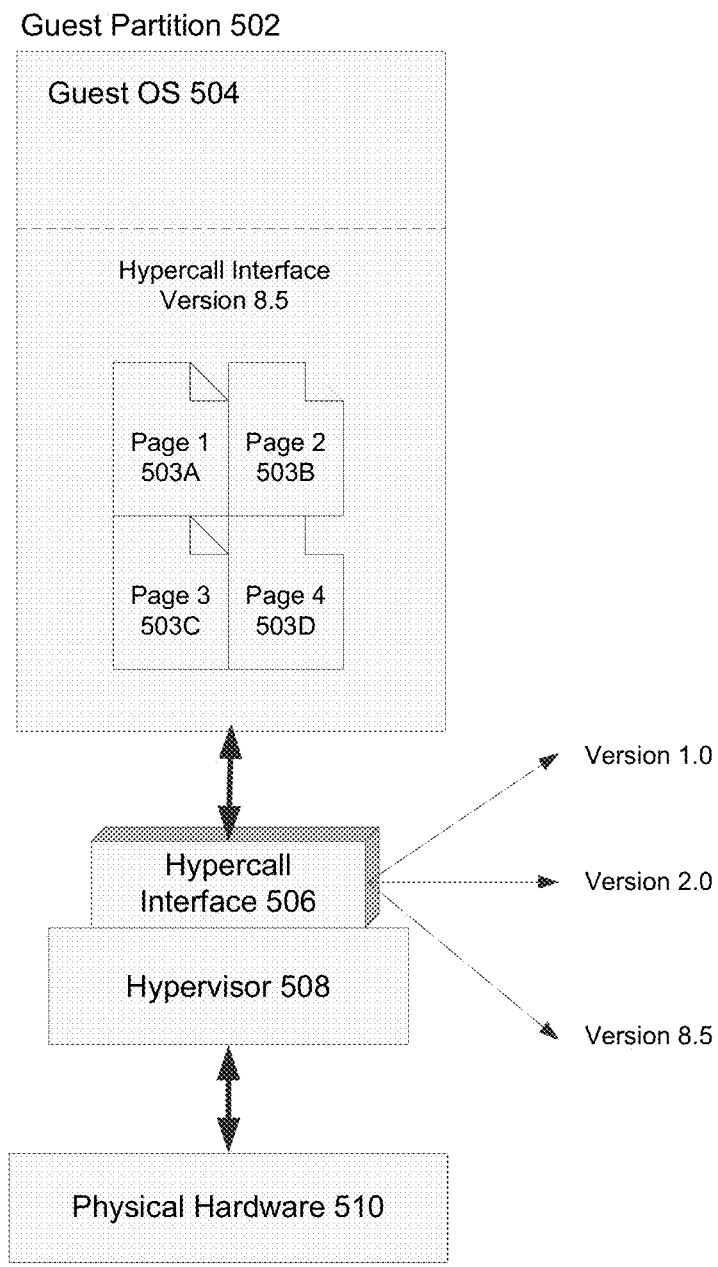
FIG. 5 illustrates versioning management that enables a guest partition to select an appropriate version of a hypervisor interface.

By way of example, in FIG. 5, version 8.5 is selected and four pages 503A-503D are allocated. These pages are allocated contiguously (as illustrated by the pages being next to each other) in an unoccupied physical address space of the guest partition 502. The unoccupied physical address space is also known as the hypercall code area.

The guest OS 504 establishes the base address of this page allocation 503A-503D, together with the number of pages allocated in the unoccupied physical address. In response to this, the hypervisor 508 causes the calling code to appear (to be injected into) the guest address space of the guest partition 502. In general terms, "injection" entails the manifestation of one or more pages of information, such as code or data, in the physical address space of a partition, where the pages are owned by a hypervisor. Moreover, the pages are owned by the hypervisor but are accessible to the guest partition 502. Once the information is injected into a guest partition 502, the guest OS 504 may then follow a hypercall protocol (or a calling convention) to call the hypervisor 508.

If at a later time the guest OS 504 wishes to change a version of the hypercall interface—if, for example, different components within the guest partition 502 use a different hypercall version—the guest OS 504 must first ensure that any outstanding requests for services asked of the hypervisor have been completed. Then, the allocated pages for the current version are deactivated, and another version can be injected into the guest partition 502. Otherwise, if any outstanding requests are pending a general protection fault will be delivered.

Figure 6A:
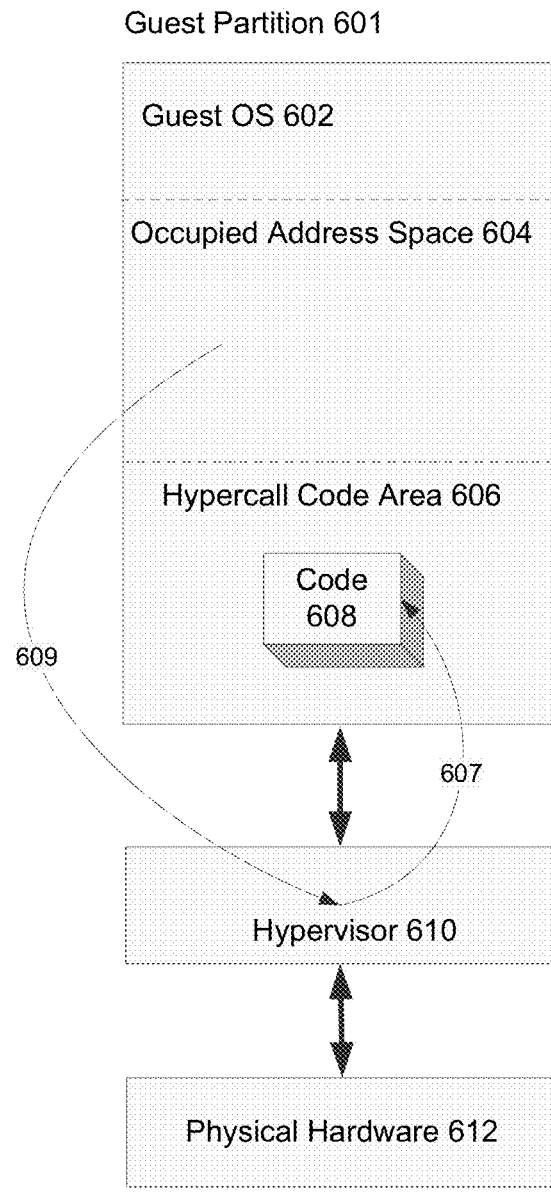
FIG. 6A illustrates code injection by the hypervisor into a guest partition.

In another aspect of the invention, a mechanism is illustrated for the hypervisor to insert or inject calling code into the guest partition's address space. Thus, in FIG. 6A, the hypervisor 610, which sits atop some real physical hardware 612, injects 607 code 608 from its own image into a region of unoccupied guest physical address space called the hypercall code area 606—to be distinguished from occupied address space 604. The hypercall code area is just part of the guest partition 601, where the guest partition 601 contains a guest OS 602.

This code 608 injection 607 allows the guest OS 602 to call 609 into the hypervisor 610. Moreover, the code 608 injection 607 removes potential versioning problems that would otherwise result from this code existing as part of the guest partition image; it also abstracts any platform-specific differences.

The guest OS 602 determines both the physical and virtual address of the injected code 608. Calling the hypervisor 610 through this code area 606 is the architecturally proper calling method in one aspect of the invention, and the hypervisor 610 may reject calls 609 that originate outside this area 606 (such as from address space 604) by issuing a general protection fault to the offending guest OS 602.

Figure 6B:
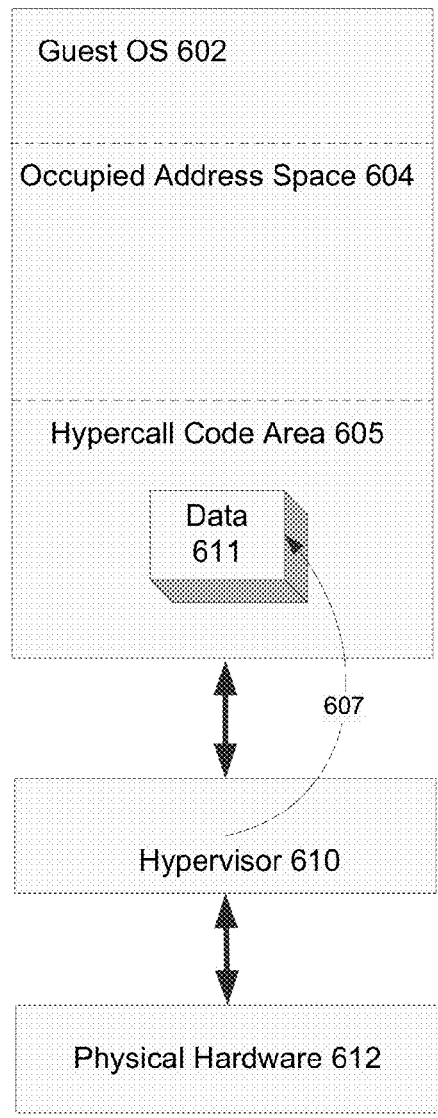
FIG. 6B illustrates data injection by the hypervisor into a guest partition.

In another aspect of the invention, in FIG. 6B, data 611 instead of code 608 (see FIG. 6A) is injected 607 by the hypervisor 610 into the hypercall data area 605. This area is also part of the unoccupied address space portion of the guest partition 601 like the hypercall data area 606. The data injection can be used to provide writable "registers" for the guest OS 602 to communicate with the hypervisor 610 without the cost of actually calling the hypervisor 610. Alternatively, the data can act as read-only registers containing information such as the current system time or the status of hypervisor operations.

Once the code (or additionally, data) is injected into the guest partition, the guest OS may then follow a hypercall protocol to call the hypervisor. In various aspects of the invention, at least four calling conventions are contemplated: (1) restartable instructions; (2) a looping mechanism; (3) shared memory transport; and (4) packets, which can be processed either synchronously or asynchronously.

A calling convention allows a guest OS to specify a requested operation from a hypervisor together with any parameters; it then allows the guest OS to receive any responses from a hypervisor once the operation is complete. The hypervisor typically maintains system availability and provides support for real-time operations. However, the hypervisor also relies on services residing in other trusted partitions. One example of this is the physical memory manager that provides the hypervisor with additional pages of memory when the hypervisor runs out of them. Such trusted partitions can also call the hypervisor, so that the hypervisor can still make requests of such services even if the partition containing such services call into the hypervisor.

Figure 7:
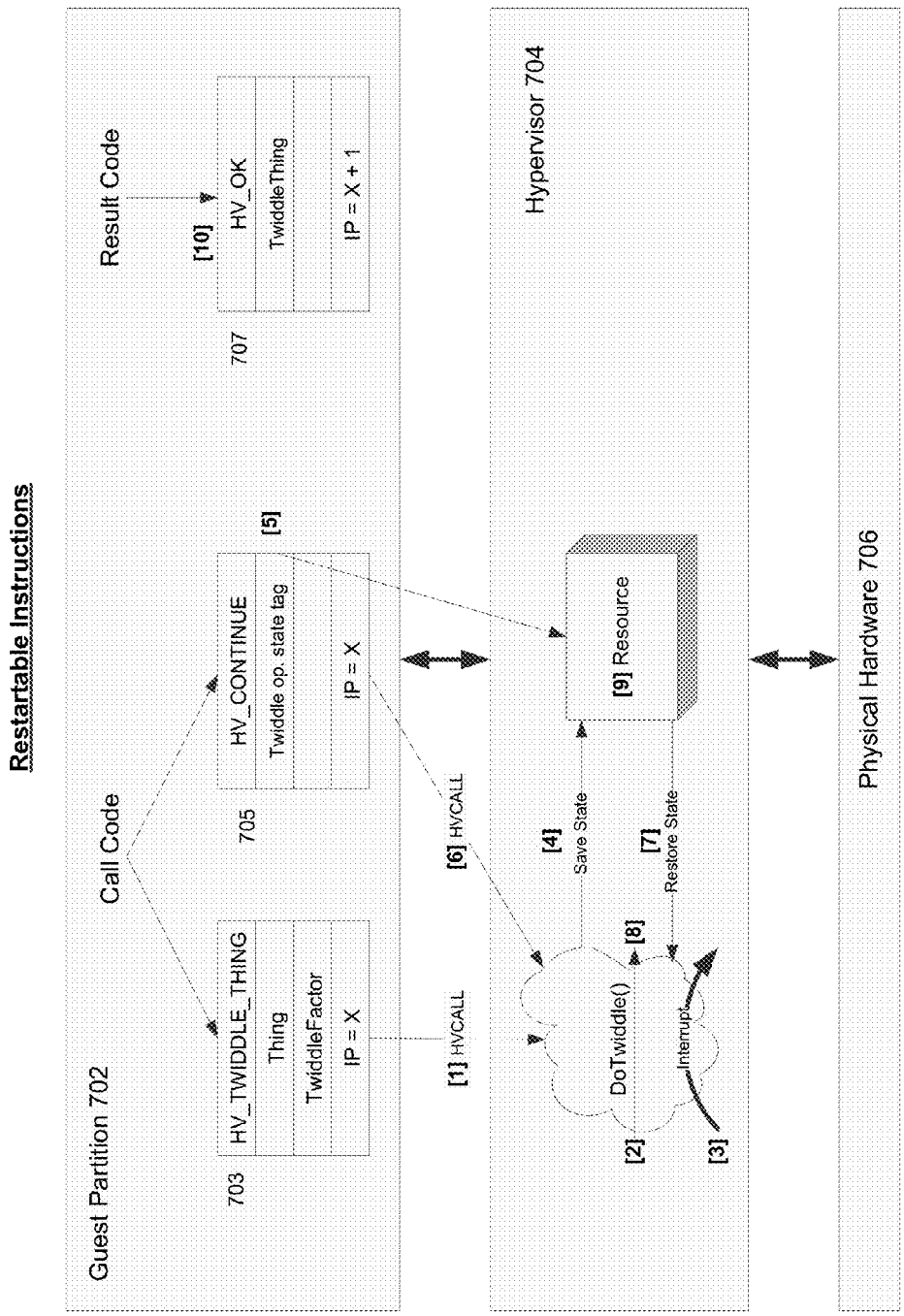
FIG. 7 illustrates a restartable instructions calling convention for allowing a hypervisor and a partition to communicate in an agreed upon manner.

In another aspect of the invention, in FIG. 7, a calling convention in the form of restartable instructions is illustrated. Specifically, a state diagram illustrating ten typical actions, [1]-[10], is depicted. As a preliminary step, the guest partition 702 populates processor registers 703 with call information for the hypervisor 704, including the call code and any input instructions for the hypervisor 704. Then, in the first action [1], it issues a HVCALL call which transitions into the hypervisor 704. The input instructions can be issued, as discussed above with reference to FIG. 6A, to request performance of some operation, such as DoTwiddle( ), by the hypervisor 704.

In the second action, the hypervisor 704 begins processing [2] the operation according to the input instructions. Third, an external event [3] occurs that necessitates control be transferred elsewhere. This event is evidenced by an interrupt and can be brought on by a need for services from some other partition. Fourth, the intermediate state of the operation is saved [4] in some resource [9]. Fifth, a tag [5] is allocated to refer to this state stored in the resource [9], and the guest's registers are updated to make an HV_CONTINUE call once the external event is finished. The guest instruction pointer (IP) is not modified so it still points to the HVCALL instruction. This can be seen by the instruction pointer being the same (IP=X) in the HV_TWIDDLE_THING registers 803 and in HV_CONTINUE 705 registers (IP=X).

Sixth, the original calling thread is re-scheduled and the HVCALL call [6] enters the hypervisor requesting continuation of the original operation, namely DoTwiddle( ). Seventh, the saved state is restored [7] and the operation continues. Eighth, the operation eventually is completed [8] (having originally started in the second action [2] via the original HVCALL [1]). Ninth, the hypervisor 804 releases any resources [9] it was using to store the state of the operation. Finally, in the tenth action, the hypervisor 704 updates the guest registers 707 with the result of the operation together with any output parameters [10]. The guest EP is then advanced past HVCALL (where IP=X+n, where n is the length of the HVCALL instruction) and control is transferred back to the calling guest partition 702.

Figure 8:
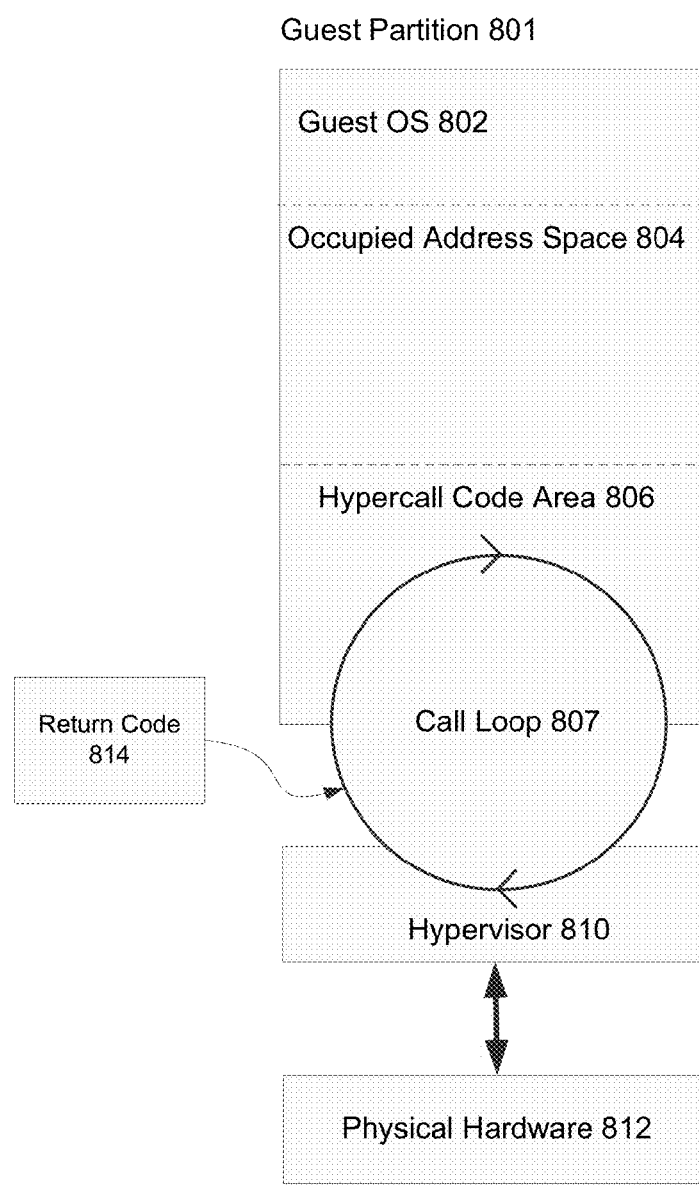
FIG. 8 illustrates a looping calling convention for allowing a hypervisor and a partition to communicate in an agreed upon manner.

In another aspect of the invention, in FIG. 8, a looping calling convention is illustrated. In the looping calling convention, the guest OS 802 calls the hypervisor 810 in a loop 807, with a return code 814 indicating whether a requested operation has been completed or if it was preempted and the guest OS should call back to complete it. In the preemption case, a number is also returned which the guest OS 802 uses to indicate which preempted operation to continue. Notably, unlike in the restartable instructions calling convention, in the looping calling convention the guest instruction pointer is advanced after the guest OS calls back to continue an operation to be performed by the hypervisor 810.

The following are two sample codes that can be used to implement the looping mechanism. Two forms of the looping mechanism exist, differing by whether the guest OS or the hypervisor allocates a continuation tag for an operation to continue (the operation being performed by the hypervisor 810). In the first example, the hypervisor allocates the continuation tag:

```
HV_RESULT
HyperPumpWithHypervisorTags(
    IN UINT32 CallCode,
    IN PBYTE InputParameters,
    IN UINT32 InputParametersSize,
    IN PBYTE OutputParameters,
    IN UINT32 OutputParametersSize
    )
{
    HV_RESULT r;
    UINT32 continuationTag;
    r = CallHypervisor(CallCode,
        InputParameters,
        InputParametersSize,
```

```
        OutputParameters,
        OutputParametersSize,
        &continuationTag
        );
while (r == HV_CONTINUE)
{
    //
    // If HV_CONTINUE was returned then the HV gave us a
    continuation tag which
    // we can callback with a CONTINUE_OPERATION to continue
    processing the call
    //
    r = CallHypervisor(HV_CALL_CONTINUE_OPERATION,
        (PBYTE)&continuationTag,
        sizeof(UINT32),
        OutputParameters,
        OutputParametersSize,
        &continuationTag
        );
}
return r;
}
```

Conversely, the following is the sample code for guest OS continuation tag allocation:

```
HV_RESULT
HyperPumpWithGuestTags(
    IN UINT32 CallCode
    IN PBYTE InputParameters,
    IN UINT32 InputParametersSize,
    IN PBYTE OutputParameters,
    IN UINT32 OutputParametersSize
    )
{
    HV_RESULT r;
    //
    // Allocate a tag for the call ans submit it
    //
    UINT32 continuationTag = AllocateTag( );
    r = CallHypervisor(CallCode,
        InputParameters,
        InputParametersSize,
        OutputParameters,
        OutputParametersSize,
        continuationTag
        );
    while (r == HV_CONTINUE)
    {
        //
        // If HV_CONTINUE was returned then calling back specifing the
        tag
        // given when the call was first presented allows the call to be
        // continued
        //
        r = CallHypervisor(HV_CALL_CONTINUE_OPERATION,
            (PBYTE)&continuationTag,
            sizeof(UINT32),
            OutputParameters,
            OutputParametersSize,
            continuationTag
            );
    }
    return r;
}
```

Notably, in the looping model, the guest OS 802 provides the processing time needed for requested hypervisor 810 operations. This is an advantageous solution since the amount of processing time given to each partition is controlled, and this in turn prevents one partition from using the hypervisor 810 to starve out another partition.

Figure 9:
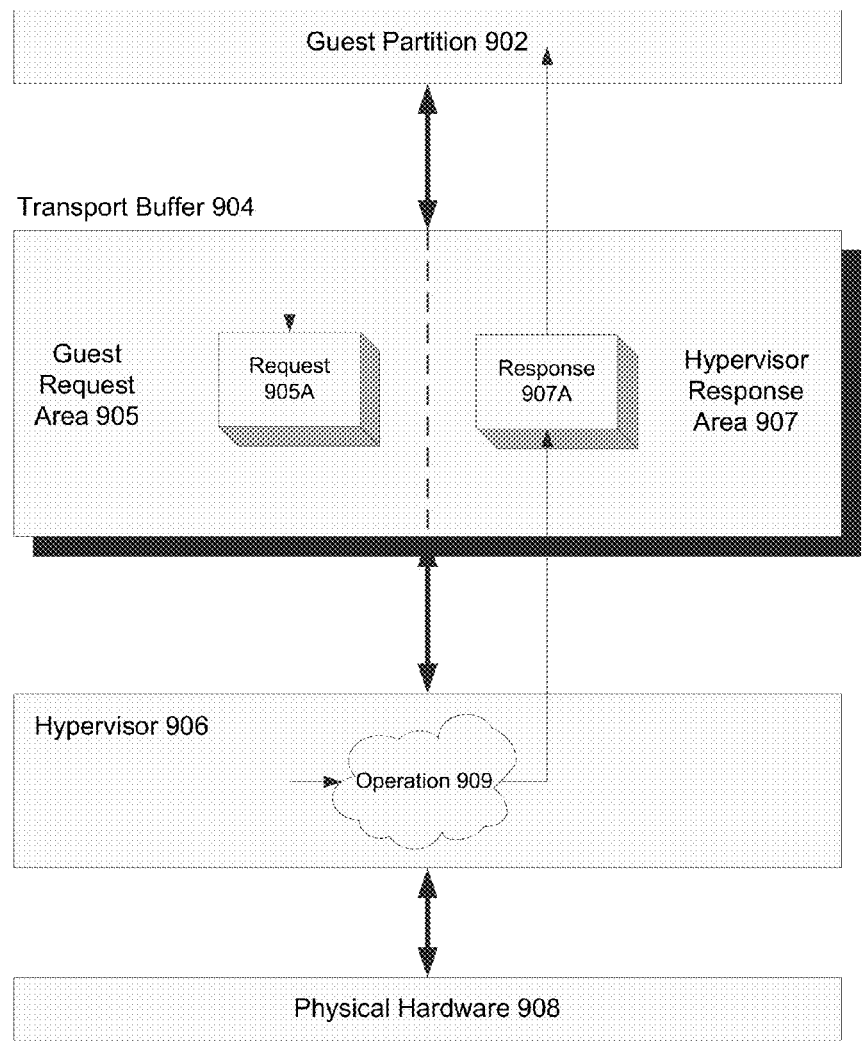
FIG. 9 illustrates shared memory transport calling convention for allowing a hypervisor and a partition to communicate in an agreed upon manner.

In another aspect of the invention, shared memory transport is used as yet another calling convention. In this aspect, in FIG. 9, a guest partition 902 has access to a transport buffer 904; likewise, a hypervisor 906, sitting on top of some physical hardware 908, has access to the transport buffer 905. The transport buffer 904 is a region of shared memory that is set up between the hypervisor 906 and the guest partition 902. This region 904 is partitioned into an area for guest requests 905 and an area for hypervisor responses 907.

In one example, the guest partition 902 first writes details of an operation that it wants the hypervisor to perform. This is depicted as a request 905A stored in the guest request area 905. Moreover, the guest partition 902 may additionally perform some trigger operation to inform the hypervisor 906 that there is information (code or data) ready for it.

Second, the hypervisor 906 begins processing any operations 909 by removing the call code and parameters from the transport buffer 904 that are stored in the request 905A. During this process, the guest partition 902 may explicitly donate processor cycles for the operations by calling into the hypervisor 906. Moreover, the hypervisor 906 may implement worker threads to process any operations 909.

Third, the operations 909 may be completed or they may be preempted during their processing and their value saved and restored. The results of the operations 909 are copied into the hypervisor response area 907, specifically, into some specific area of memory containing the response 907A.

Finally, the guest partition 902 can then check for the hypervisor 906 response 907A in the hypervisor response area 907. Alternatively, the guest partition 902 can be informed by an interrupt that responses are ready and then the guest partition 902 can read the results stored in response 907A.

Figure 10:
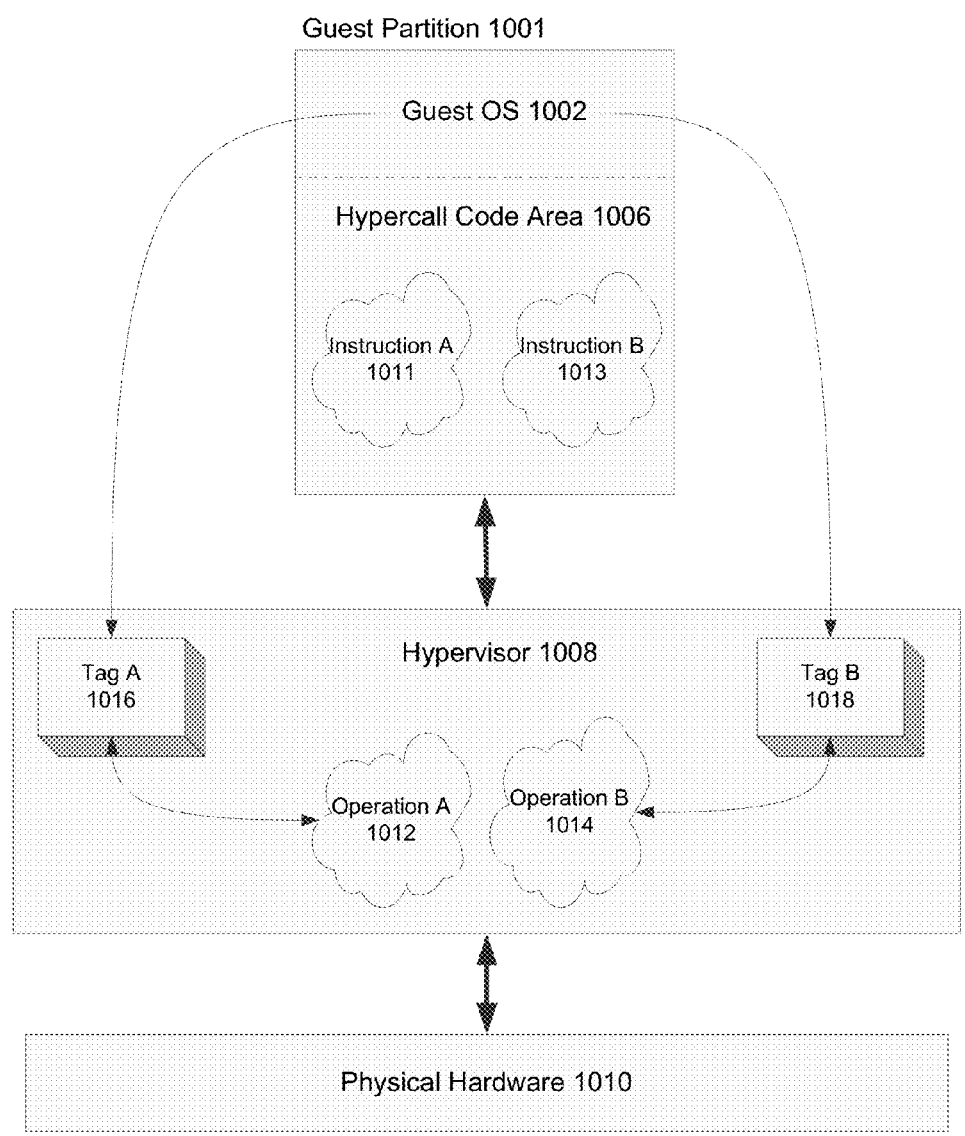
FIG. 10 illustrates a cancellation mechanism for canceling calls from a partition to a hypervisor.

In another aspect of the invention, certain calls into the hypervisor 1008 may be canceled. FIG. 10 illustrates a cancellation mechanism where a guest OS 1002 running in a partition 1001 can cancel operations in a hypervisor 1008. Specifically, a guest OS 1002 can cancel operation A 1012 that was issued by instruction A 1011. The guest OS 1002 does this via a pointer to the tag A 1016, which "tags" operation A 1012. The tags themselves are managed by the hypervisor 1008.

Likewise, the guest OS 1002 can cancel operation B 1014 that was issued by instruction B 1013 via a pointer to the tag B 1018. Moreover, more than one operation can be cancelled at once. For example, if tag A 1016 in FIG. 10 were to refer to both operation A 1012 and operation B 1014, then one tag (tag A 1016) could cancel both operations. In such a scenario, the tag would be called a "call group" in the sense that it could cancel a group of operations at once using one call.

Moreover, in such a call group scenario a single call group could correspond to a guest partition thread, such that if the thread were to "die," the guest partition could use the call group tag to cancel any pending hypercalls made from that thread. Furthermore, a timer could be used to check for termination of a thread at a specified interval, such as one timer tick. Thus, if the thread is being terminated or a timeout has expired, a request can be cancelled. Since a cancel can be too early (if the hypercall hasn't begun yet) or too late (if the hypercall has finished), the timer can be queued repetitively.

In yet another aspect of the invention, a packet-based calling convention is presented. In this convention, a packet contains the call code to the hypervisor that was injected by the hypervisor, any input parameters for an operation to be performed by the hypervisor, and space allocation for any response from the hypervisor that is based on a request made by a calling partition. The packet-based calling convention can be either synchronous or asynchronous. In the former case, an operation is performed by the hypervisor until it is complete—without interrupting the operation; in the latter case, a tag is allocated (by the calling partition) to an operation to be performed by the hypervisor, and when the hypervisor is done performing the operation, it sends an interrupt to the guest partition for determination what operation was completed based on the tag.

While the present invention has been described in connection with the preferred aspects, as illustrated in the various figures, it is understood that other similar aspects may be used or modifications and additions may be made to the described aspects for performing the same function of the present invention without deviating therefrom. For example, in certain aspects of the invention, hypervisor discovery mechanisms were mentioned, such as registers or virtual devices. Moreover, code and data injections mechanisms were mentioned that then allow for certain calling conventions to be established, such as restartable instructions, the looping mechanism, and shared memory transport. However, other equivalent devices to this aspect of the invention are also contemplated by the teachings herein. Therefore, the present invention should not be limited to any single aspect, but rather construed in breadth and scope in accordance with the appended claims.

What is claimed:

1. A system for discovering and utilizing a virtualizing program, comprising:
   a processor; and
   a memory communicatively coupled to said processor when the system is operational, the memory bearing computer-executable instructions that, upon execution by the processor, cause the operations comprising:
      determining the presence of the virtualizing program through the use of a virtualized device;
      receiving at least one page of information manifested into the physical address space of a partition, wherein the at least one page of information is indicative of a calling convention, and wherein the at least one page of information is owned by the virtualization program and is accessible to the partition;
      establishing the calling convention with the virtualizing program, based on the at least one page of information; and
      sending a requested operation to the virtualizing program using the calling convention, such that the virtualizing program performs the requested operation.

2. The system of claim 1, wherein the virtualized device comprises:
   the processor's registers.

3. The system of claim 1, wherein the virtualized device comprises:
   a virtual hardware device.

4. The system of claim 1, wherein the at least one page of information comprises:
   code.

5. The system of claim 1, wherein the calling convention is based on one of restartable instructions, a calling loop, and a shared memory transport.

6. The system of claim 1, wherein the memory further bears processor-executable instructions that, upon execution by the processor, cause the processor to perform operations comprising:
   sending a second requested operation to the virtualization program; and
   sending an indication to cancel the second requested operation to the virtualization program before the virtualization program has performed the second requested operation, such that the virtualization program does not perform the second requested operation.

7. The system of claim 1, wherein the requested operation comprises:
   a parameter.

8. A method for discovering and utilizing a virtualizing program, comprising:
   determining the presence of the virtualizing program through the use of a virtualized device;
   receiving at least one page of information manifested into the physical address space of a partition, wherein the at least one page of information is indicative of a calling convention;
   establishing the calling convention with the virtualizing program, based on the at least one page of information; and
   sending a requested operation to the virtualizing program using the calling convention, such that the virtualizing program performs the requested operation.

9. The method of claim 8, wherein the virtualized device comprises:
   the processor's registers.

10. The method of claim 8, wherein the virtualized device comprises:
    a virtual hardware device.

11. The method of claim 8, wherein the at least one page of information comprises:
    code or data.

12. The method of claim 8, wherein receiving at least one page of information manifested into the physical address space of a partition, wherein the at least one page of information is indicative of a calling convention comprises:
    selecting the calling convention from a plurality of calling conventions.

13. The method of claim 8, wherein the calling convention is based on of a calling loop.

14. The method according to claim 8, further comprising:
    sending a second requested operation to the virtualization program; and
    sending an indication to cancel the second requested operation to the virtualization program before the virtualization program has performed the second requested operation, such that the virtualization program does not perform the second requested operation.

15. The method of claim 8, wherein receiving at least one page of information manifested into the physical address space of a partition, wherein the at least one page of information is indicative of a calling convention comprises:
    selecting the calling convention from a plurality of calling conventions, the calling convention using one or more pages of memory of the partition when manifested into the partition;
    allocating the one or more pages of memory to store the chosen calling convention;
    sending the virtualization program a base address along with the number of the one or more pages; and
    receiving an indication of the calling convention from the virtualization program, the indication of the calling convention being manifested in the one or more pages by the virtualization program.

16. The method of claim 8, further comprising:
    determining to use a second calling convention;
    determining that all outstanding requested operations for the virtualization program for the partition have been completed;
    deactivating the one or more pages of memory;
    allocating a second set of one or more pages of memory to store the second chosen calling convention;

sending the virtualization program a second base address along with the number pages in the second set of one or more pages; and receiving an indication of the second calling convention from the virtualization program, the indication of the second calling convention being manifested in the second set of one or more pages by the virtualization program.

17. The method of claim 8, wherein sending a requested operation to the virtualizing program using the calling convention, such that the virtualizing program performs the requested operation comprises:

the virtualization program determining that the requested operation originated from a memory area of the at least one page of information.

18. A computer-readable storage medium bearing computer-executable instructions for discovering and utilizing a virtualizing program that, upon execution by a computer, cause the computer to perform operations comprising:

determining the presence of the virtualizing program through the use of a virtualized device;

receiving at least one page of information manifested into the physical address space of a partition, wherein the at least one page of information is indicative of a calling convention;

establishing the calling convention with the virtualizing program, based on the at least one page of information; and sending a requested operation to the virtualizing program using the calling convention, such that the virtualizing program performs the requested operation.

19. The computer-readable storage medium of claim 18, wherein the at least one page of information comprises data.

20. The computer-readable storage medium of claim 18, further bearing computer-executable instructions that, upon execution by the computer, cause the computer to perform operations comprising:

sending a second requested operation to the virtualization program; and sending an indication to cancel the second requested operation to the virtualization program before the virtualization program has performed the second requested operation, such that the virtualization program does not perform the second requested operation.

* * * * *